US012225901B2

United States Patent
Ishibashi et al.

(10) Patent No.: US 12,225,901 B2
(45) Date of Patent: Feb. 18, 2025

(54) AEROSOL SPRAYER FOR INSECT PEST MATING DISRUPTION

(71) Applicant: SHIN-ETSU CHEMICAL CO., LTD., Tokyo (JP)

(72) Inventors: Naoki Ishibashi, Joetsu (JP); Yuki Miyake, Joetsu (JP); Takeshi Kinsho, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 494 days.

(21) Appl. No.: 17/243,113

(22) Filed: Apr. 28, 2021

(65) Prior Publication Data

US 2021/0329911 A1    Oct. 28, 2021

Related U.S. Application Data

(60) Provisional application No. 63/016,368, filed on Apr. 28, 2020.

(51) Int. Cl.
| | |
|---|---|
| *A01N 49/00* | (2006.01) |
| *A01M 7/00* | (2006.01) |
| *A01N 25/06* | (2006.01) |
| *A01N 35/02* | (2006.01) |

(52) U.S. Cl.
CPC .......... *A01N 25/06* (2013.01); *A01M 7/0014* (2013.01); *A01N 35/02* (2013.01); *A01N 49/00* (2013.01)

(58) Field of Classification Search
CPC ...... A01N 25/06; A01N 49/00; A01M 7/0014
See application file for complete search history.

(56) References Cited

U.S. PATENT DOCUMENTS

| | | | |
|---|---|---|---|
| 2007/0248636 A1 | 10/2007 | Higbee et al. | |
| 2012/0316220 A1* | 12/2012 | Ward | A61P 31/10 514/44 R |

FOREIGN PATENT DOCUMENTS

JP    2016-74645 A    5/2016

OTHER PUBLICATIONS

Coffelt et al., "Isolation, Identification, and Synthesis of a Female Sex Pheromone of the Navel Orangeworm, *Amyelois transitella* (*Lepidoptera: Pyralidae*)," Journal of Chemical Ecology, 1979, vol. 5, No. 6, pp. 955-966.
Shorey et al., "Use of Puffers for Disruption of Sex Pheromone Communication Among Navel Orangeworm Moths (*Lepidoptera: Pyralidae*) in Almonds, Pistachios, and Walnuts," Physiological and Chemical Ecology, 1996, vol. 25, No. 5, pp. 1154-1157.
Suterra, "Puffer NOW and CheckMate Puffer NOW Pro," Safety Data Sheet, Apr. 14, 2015, pp. 1-6, [https://s3-us-west-1.amazonaws.com/www.agrian.com/pdfs/Puffer_NOW_MSDS1i.pdf].
Burks et al., "Optimizing Efficiency of Aerosol Mating Disruption for Navel Orangeworm (*Lepidoptera: Pyralidae*)," Journal of Economic Entomology, 2019, vol. 112, No. 2, pp. 763-771.
Sep. 29, 2021 Extended Search Report issued in European Patent Application No. 21169570.5.
Mar. 5, 2024 Office Action issued in Japanese Patent Application No. 2021-073519.
Mar. 12, 2024 Search Report issued in European Patent Application No. 21169570.5.

\* cited by examiner

*Primary Examiner* — Abigail Vanhorn
(74) *Attorney, Agent, or Firm* — Oliff PLC

(57) ABSTRACT

A composition for forming an aerosol, an aerosol sprayer for insect pest mating disruption, and a method for insect pest mating disruption, thereby reducing disadvantageous effects caused by falling to a ground surface and oxidative decomposition of the sprayed particles. More specifically, the composition including an aerosol stock solution containing an aliphatic linear aldehyde having 10 to 20 carbon atoms and a non-alcoholic diluent, and a propellant, wherein a weight ratio of the aerosol stock solution to the propellant is from 45:55 to 65:35; the sprayer including the composition and a pressure resistant container for enclosing the composition therein, wherein sprayed particles at a spray travel distance of 15 cm have a median particle size (Dv50) at 25° C. of from 35 to 65 μm by a volume-based cumulative particle size distribution and; the method using the aerosol sprayer; and the like.

16 Claims, 1 Drawing Sheet

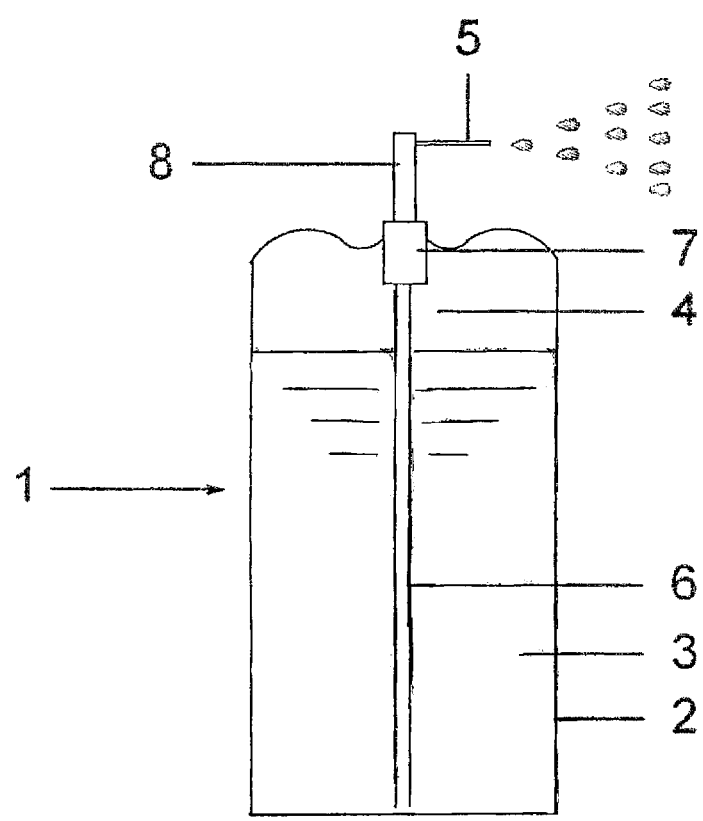

AEROSOL SPRAYER FOR INSECT PEST MATING DISRUPTION

BACKGROUND OF THE INVENTION

1. Field of the Invention

The invention relates to an aerosol sprayer for insect pest mating disruption, the sprayer comprising an aliphatic linear aldehyde having 10 to 20 carbon atoms, a non-alcoholic diluent and a propellant enclosed therein.

2. Related Art

The navel orangeworm (*Amyelois transitella*) is an insect pest that damages many crops including nut crops such as almonds, pistachios and walnuts in the United States. It has been reported in J. Chem. Ecol 5, 955 (1979) that Z11Z13-hexadecadienal is a component of the sex pheromone of the navel orangeworm. Attempts to control the navel orangeworm have been made through the mating disruption by releasing this compound from an aerosol can.

For example, Shorey et al. conducted the mating disruption by using an aerosol can containing 0.6% by weight of Z11Z13-hexadecadienal, 47.1% by weight of ethanol as a diluent, and 45.6% by weight of a mixture of propane and butane as a propellant (Environ. Entomol. 25, 1154 (1996)).

Higbee et al. conducted the mating disruption by using an aerosol can containing 1.0% by weight of Z11Z13-hexadecadienal, 28.4% by weight of heptane and 6.0% by weight of acetone as diluents, and 64.5% by weight of 1,1,1,2-tetrafluoroethane as a propellant (US 2007/0248636A1).

SUMMARY OF THE INVENTION

However, the mating disruption in J. Chem. Ecol 5,955 (1979) is not preferable from the viewpoint of stability because ethanol used as an alcoholic diluent may react with Z11Z13-hexadecadienal, which is a sex pheromone component, to produce a Z11Z13-hexadecadienal diethyl acetal different from the sex pheromone component which is originally desired to be released. In the mating disruption in Environ. Entomol. 25, 1154 (1996), aerosol particles released from an aerosol can are once absorbed into a pad made of cotton, and then Z11Z13-hexadecadienal is gradually released from the pad. Since Z11Z13-hexadecadienal has an unstable formyl group and Z,Z-conjugated double bonds, oligomerization, polymerization or the like is likely to proceed when concentrated in a pad.

In the mating disruption in US 2007/0248636A1, heptane used as a non-alcoholic diluent prevents Z11Z13-hexadecadienal from being converted into the acetal. In addition, since aerosol particles are released into the field directly from an aerosol can without a pad, there is a low possibility that oligomerization, polymerization or the like proceeds. However, since as much as 64.5% by weight of 1,1,1,2-tetrafluoroethane is used as a propellant, each particle size of the sprayed aerosol particles becomes extremely small, so that the total contact area of the aerosol particles to get in contact with oxygen increases. This makes Z11Z13-hexadecadienal more susceptible to oxidation of the formyl group by atmospheric oxygen, and isomerization and oxidation of Z,Z-conjugated double bonds. Thus, the efficiency of released Z11Z13-hexadecadienal is reduced, and as a result, the nuts are damaged at a ratio of as high as about 5% in the field having a high density of navel orangeworms.

The smaller the sizes of the aerosol particles, the longer the duration of flight before the particles fall to the surface of the ground. Thus, it is considered that the smaller aerosol particles are advantageous because they are likely to be transported to longer distances. However, when an excess of propellant is used to generate the smaller aerosol particles, the particle sizes become too fine so that decomposition of the pheromone component is apt to occur. In particular, an aliphatic linear aldehyde having 10 to 20 carbon atoms such as Z11Z13-hexadecadienal, which is a sex pheromone component of the navel orangeworm, is susceptible to oxidation and therefore need to be released with appropriate sizes of aerosol particles.

In view of the above circumstances, the invention provides an aerosol sprayer for insect pest mating disruption, the sprayer containing the components and providing the particle size distribution which are suitable for effectively utilizing an aliphatic linear aldehyde having 10 to 20 carbon atoms.

As a result of extensive studies to solve the above problems, the inventors have found that a weight ratio of an aerosol stock solution containing an aliphatic linear aldehyde having 10 to 20 carbon atoms to a propellant, and the sizes of the sprayed particles have a large influence on an insect pest control by the aerosol sprayer for insect pest mating disruption, and thus have completed the invention.

In an aspect of the invention, there is provided a composition for forming an aerosol, the composition comprising an aerosol stock solution containing an aliphatic linear aldehyde having 10 to 20 carbon atoms and a non-alcoholic diluent; and a propellant; wherein a weight ratio of the aerosol stock solution to the propellant is from 45:55 to 65:35.

In another aspect of the invention, there is provided an aerosol sprayer for insect pest mating disruption, the sprayer comprising the composition; and a pressure resistant container for enclosing the composition therein; wherein sprayed particles at a spray travel distance of 15 cm have a median particle size (Dv50) at 25° C. of from 35 to 65 μm by a volume-based cumulative particle size distribution.

In still another aspect of the invention, there is provided a method for insect pest mating disruption, the method comprising steps of: installing the aerosol sprayer at a concentration of from 0.5 to 4 sprayers/acre in a field; and spraying the composition contained in the aerosol sprayer into the field.

In a further aspect, there is provided a method for insect pest mating disruption, the method comprising a step of spraying the composition into a field in such a manner that sprayed particles at a spray travel distance of 15 cm have a median particle size (Dv50) at 25° C. of from 35 to 65 μm by a volume-based cumulative particle size distribution.

According to the invention, the disadvantageous effects of the sprayed particles falling on the ground surface or being subjected to oxidative decomposition can be reduced, so that the aliphatic linear aldehyde having 10 to 20 carbon atoms can be diffused into the field. As a result, the target insect pest can be efficiently controlled by mating disruption to reduce the damage of the crop.

BRIEF DESCRIPTION OF THE DRAWING

The FIGURE shows an embodiment of the aerosol sprayer.

DETAILED DESCRIPTION OF THE PREFERRED EMBODIMENTS

[I] Composition for Forming an Aerosol

The composition for forming an aerosol is a composition for introducing into a pressure-resistant container of an aerosol spray. The composition for forming an aerosol comprises an aerosol stock solution and a propellant, and the aerosol stock solution comprises an aliphatic linear aldehyde having 10 to 20 carbon atoms and a non-alcoholic diluent.

<i> Aerosol Stock Solution

An aerosol stock solution is described. The aerosol stock solution contains an aliphatic linear aldehyde having 10 to 20 carbon atoms and a non-alcoholic diluent.

Examples of the insect pest containing an aliphatic linear aldehyde having 10 to 20 carbon atoms as a sex pheromone component include the following insect pests.

TABLE 1

| insect pest (scientific name) | sex pheromone component |
| --- | --- |
| navel orangeworm (Amyelois transitella) | Z11Z13-hexadecadienal |
| American bollworm (Helicoverpa armigera) | Z11-hexadecenal |
| diamondback moth (Plutella xylostella) | |
| rice stem borer (Chilo suppressalis) | |
| oriental tobacco budworm (Heliothis assulta) | Z9-hexadecenal |
| rice stem borer (Chilo suppressalis) | Z13-octadecenal |
| carob moth (Apomyelois ceratoniae) | Z9E11,13-tetradecatrienal Z9E11-tetradecadienal Z9-tetradecenal |
| avocado seed moth (Stenoma catenifer) | Z9-9,13-tetradecadien-11-ynal |
| olive moth (Prays oleae) | Z7-tetradecenal |
| citrus flower moth (Prays citri) | |
| South American tortricid moth (Argyrotaenia sphaleropa) | Z11,13-tetradecadienal |
| nettle caterpillar (Setothosea asigna, Setora nitens) | Z9,11-dodecadienal E9,11-dodecadienal |
| sugarcane borer (Diatraea saccharalis) | Z9E11-hexadecadienal |
| pecan nut casebearer (Acrobasis nuxvorella) | E9Z11-hexadecadienal |
| citrus leafminer (Phyllocnistis citrella) | Z7Z11E13-hexadecatrienal |

In addition to the above examples, examples of the aliphatic linear aldehyde having 10 to 20 carbon atoms include Z5-decenal, 10-undecenal, n-dodecanal, Z9-dodecenal, E5Z10-dodecadienal, E8E10-dodecadienal, n-tetradecanal, Z11-tetradecenal, Z9Z11-tetradecadienal, Z9E12-tetradecadienal, Z10-pentadecenal, E9Z11-pentadecenal, n-hexadecanal, Z7-hexadecenal, E6Z11-hexadecadienal, E4Z6-hexadecadienal, E4E6Z11-hexadecatrienal, E10E12E14-hexadecatrienal, n-octadecanal, Z9-octadecenal, E14-octadecenal, E2Z13-octadecadienal, Z3Z13-octadecadienal, Z9Z12-octadecadienal, and Z9Z12Z15-octadecatrienal. The aliphatic linear aldehydes having 10 to 20 carbon atoms may be used singly or in a combination of two or more.

More preferable examples of the aliphatic linear aldehyde having 10 to 20 carbon atoms include Z11Z13-hexadecadienal, Z9E11,13-tetradecatrienal, Z9E11-tetradecadienal, Z9-tetradecenal, Z9-9,13-tetradecadien-11-ynal, Z7-tetradecenal, Z9,11-dodecadienal, E9,11-dodecadienal, Z9E11-hexadecadienal, E9Z11-hexadecadienal, and Z7Z11E13-hexadecatrienal. Particularly preferable examples of the aliphatic linear aldehyde having 10 to 20 carbon atoms include Z11Z13-hexadecadienal, which targets at, for example, a navel orangeworm.

A pheromone supplemental component may be added to the aliphatic linear aldehyde having 10 to 20 carbon atoms for the purpose of improving the mating disruption and suppressing the expression of resistance. Examples of the pheromone supplemental component include a saturated or unsaturated aliphatic linear acetate having 12 to 20 carbon atoms, a saturated or unsaturated aliphatic linear alcohol having 7 to 20 carbon atoms, a saturated or unsaturated aliphatic linear ketone having 10 to 25 carbon atom, a saturated or unsaturated aliphatic hydrocarbons having 10 to 30 carbon atoms, and a saturated or unsaturated carboxylic acid having 10 to 20 carbon atoms, wherein each of the unsaturated acetate, alcohol, hydrocarbon and carboxylic acid has one or more double bonds. The amount of the pheromone supplemental component to be added is preferably from 0.1 to 200 parts by weight relative to 100 parts by weight of the aliphatic linear aldehyde having 10 to 20 carbon atoms. The pheromone supplemental component may be used single or in a combination of two or more.

An optional additive such as an antioxidant and an ultraviolet absorber may be added to the aliphatic linear aldehyde having 10 to 20 carbon atoms.

Examples of the antioxidant include 2,6-di-tert-butyl-4-methylphenol, butylhydroxytoluene, butylhydroxyanisole, hydroquinone, 2,2'-methylenebis(4-methyl-6-t-butylphenol), and vitamin E.

Examples of the ultraviolet absorber include 2-(2'-hydroxy-3'-tert-butyl-5'-methylphenyl)-5-chlorobenzotriazole, 2-hydroxy-4-octoxybenzophenone, 2-(3,5-di-t-butyl-2-hydroxyphenyl)-5-chlorobenzotriazole, and 2,5-di-t-butylhydroquinone.

The amount of the additive to be added varies depending on the environment of usage and the like. It is preferably from 0.1 to 10 parts by weight relative to 100 parts by weight of the aliphatic linear aldehyde having 10 to 20 carbon atoms. The additive may be added singly or in combination of two or more.

Examples of the non-alcoholic diluent include hydrocarbons such as hexane, heptane, octane, nonane, decane, benzene, toluene, xylene and cumene; esters such as ethyl acetate and n-butyl acetate; ketones such as acetone and methyl ethyl ketone; ethers such as diethyl ether and dibutyl ether; nitriles such as acetonitrile and propionitrile; aprotic polar solvents such as N,N-dimethylformamide; mineral oils such as kerosene, light oil, liquid paraffin, liquid isoparaffin, amber oil and creosote oil; vegetable oils such as castor oil, linseed oil, salad oil, corn oil, soybean oil, sesame oil, rapeseed oil, safflower oil, sunflower oil, rice oil, palm oil, coconut oil, grape oil, wheat germ oil, olive oil, peanut oil, almond oil, grapeseed oil, jojoba oil, rosehip oil, avocado oil, hazelnut oil and orange oil; animal oils such as fish oil, lanolin oil, squalane, egg yolk oil, liver oil, horse oil and mink oil; and synthetic oils such as ester oils. The non-alcoholic diluent is selected preferably from hydrocarbons, and is more preferably heptane, from the viewpoint of stability of the aliphatic linear aldehyde having 10 to 20 carbon atoms.

The amount of the non-alcoholic diluent to be added is preferably from 100 to 10,000 parts by weight, more preferably from 200 to 5,000 parts by weight, relative to 100 parts by weight of the aliphatic linear aldehyde having 10 to 20 carbon atoms. The non-alcoholic diluent may be added singly or in combination of two or more. A commercially available non-alcoholic dilution may be used.

<ii> Propellant

Next, the propellant is explained.

Examples of the propellant include liquefied petroleum gas such as propane, propylene, n-butane and isobutane; liquefied gas such as dimethyl ether (hereinafter also referred to as "DME"); halogenated carbon gas such as HFC-152a, HFC-134a, HFO-1234yf and HFO-1234ze; carbon dioxide gas; nitrogen gas; and compressed gas such as compressed air. The propellant may be used singly or in combination of two or more.

The weight ratio of the aerosol stock solution to the propellant is from 45:55 to 65:35, preferably from 50:50 to 60:40. When the weight ratio of the propellant is more than 55/100, the sizes of the aerosol particles become too fine, so that oxidative decomposition of the aliphatic linear aldehyde having 10 to 20 carbon atoms is accelerated, thereby reducing the insect pest control effect. When the weight ratio of the propellant is less than 35/100, the ratio of the aerosol particles having large particle sizes to the total of the aerosol particles increases so that and the aerosol particles having such large particle sizes fall to the surface of the ground before diffused into the field, thereby reducing the insect pest control effect.

[II] Aerosol Sprayer for Insect Pest Mating Disruption

An aerosol sprayer for insect pest mating disruptant is produced by enclosing the above composition for forming an aerosol in a pressure-resistant container.

The pressure-resistant container is not particularly limited as long as it can store an aerosol composition containing an aerosol stock solution and a propellant inside and allows a constant amount of the content to be sprayed. In order to keep the sprayed amount constant, the spray time may be controlled while keeping the spray rate (μL/sec) constant, or the number of spray events may be controlled while keeping the sprayed amount per spray event constant. It is preferable to make the number of spray events as low as possible, while keeping the sprayed amount per spray event constant, from the viewpoint of energy efficiency of the battery or the like. For example, it is preferably to make the number of spray events to be one event by making the sprayed amount equal to the required amount.

In one of the embodiments, the pressure resistant container is preferably equipped with a metered spray valve for controlling a sprayed amount of a composition for forming an aerosol, the composition containing an aerosol stock solution and a propellant. After the metered spray valve is connected to the spray button having the spray port, spray operation such as pressing the spray button causes the metered spray valve to operate to spray the composition from the spray port as sprayed particles. A sprayed volume per press on the spray button is controlled by the metered spray valve, and is from 20 to 100 μL, preferably from 25 to 90 μL, from the viewpoint of allowing the number of press to be from 1000 to 5000 times per 100 ml of the composition for forming an aerosol. A sprayed volume per press on the spray button contains an aliphatic linear aldehyde having 10 to 20 carbon atoms in an amount of preferably from 0.3 to 5 mg, more preferably from 0.5 to 3.5 mg, from the viewpoint of physiological action and behavior induction to insect pests as well as economy. The sprayed amount of aliphatic linear aldehyde having 10 to 20 carbon atoms per spray event is calculated by multiplying the weight loss per spray event by the concentration (i.e., weight percent) of aliphatic linear aldehyde having 10 to 20 carbon atoms.

The operation of pressing the spray button may be carried out using a mechanical device. For example, there may be used the aerosol sprayer obtained by substituting a navel orangeworm mating disruption content with the present composition for forming an aerosol, with respect to the navel orangeworm mating disruption aerosol preparation ISOMATE® NOW MIST, which is a product of Pacific Biocontrol Corporation, Vancouver, W.A., U.S.A.

The FIGURE shows an embodiment of the aerosol sprayer. The aerosol sprayer 1 comprises a pressure-resistant container 2, a liquid phase 3 containing a stock solution and a propellant, a gas phase 4 containing a propellant which has been partially evaporated, a spray port 5 for spraying the liquid phase 3 to a field, a deep tube 6 having one end placed in the liquid phase 3 and the other end connected to the spray port 5, a valve 7 for blocking the connection between the spray port 5 and the deep tube 6, and a spray button 8 to be pressed for opening the valve 7 to connect the spray port 5 and the deep tube 6. When the deep tube 6 is connected to the spray port 5 by pressing the spray button 7, the liquid phase 3 is sprayed from the spray port 5 by the pressure of the gas phase 4 containing the propellant. For example, a gasket may be installed in the valve 7 so as to block the passage connecting the spray port 5 and the deep tube 6, and the pressed spray button 8 may deform the gasket so as to open the passage.

Regarding the sprayed particles at the spray travel distance of 15 cm from the spray port, a median particle size (Dv50) at 25° C. in the volume-based cumulative particle diameter distribution is from 35 to 65 μm, preferably from 38 to 63 μm, and more preferably from 40 to 60 μm. When Dv50 is less than 35 μm, the particle sizes of the aerosol particles become too fine so that oxidative decomposition of the aliphatic linear aldehyde having 10 to 20 carbon atoms is accelerated, thereby reducing the insect pest control effect. When Dv50 is more than 65 μm, a ratio of the aerosol particles having large particle sizes to the total of the aerosol particles increases, and the aerosol particles having large particle sizes fall to the ground surface prior to be diffused into the field, thereby reducing the insect pest control effect.

Using the same reasoning for selecting Dv50, 90% particle size (Dv90) at 25° C. and 10% particle size (Dv10) at 25° C. of the sprayed particles at the spray distance 15 cm from the spray port are selected in the volume-based cumulative particle size distribution. Dv90 is preferably from 65 to 150 μm, more preferably from 70 to 145 μm, and still more preferably from 85 to 135 μm. Dv10 is preferably from 5 to 35 μm, more preferably from 11 to 32 μm, and still more preferably from 11 to 22 m.

The particle sizes of the sprayed particles may be determined, for example, by using a laser diffraction type particle size distribution measuring apparatus (Spraytech, product of Malvern Instruments Limited). For example, a spray port is installed at 25° C. and at a distance of 15 cm from the laser, and the spray event is carried out in such a manner to allow the laser to perpendicularly penetrate through the center of the group of sprayed particles for measuring the median particle size (Dv50), 10% particle size (Dv10) and 90% particle size (Dv90) in the volume-based particle size distribution.

The stem diameter of the metered spray valve, the diameter and shape of the spray port, etc. can be adjusted to allow the particle sizes of the sprayed particles to be within the above ranges.

[III] Method for Mating Disruption

The method for insect pest mating disruption comprises a step of installing the above-described aerosol sprayer for insect pest mating disruption at a concentration from 0.5 to 4 sprayers/acre in a field, and a step of spraying the composition from each aerosol sprayer into a field.

The installation number of the aerosol sprayers for insect pest mating disruption is preferably from 0.5 to 4 sprayers, more preferably from 1 to 4 sprayers per acre in the field. When the installation number is less than 0.5 sprayers per acre in the field, the aliphatic linear aldehyde having 10 to 20 carbon atoms cannot be sufficiently diffused into the field, thereby reducing the control effect. When the installation number is more than 4 sprayers per acre in the field, the labor required for installation is high and the economical efficiency is low.

Each spray event of the composition for forming an aerosol into the field is preferably carried out at an interval of from 5 to 20 minutes, more preferably at a interval of from 6 to 18 minutes, from the viewpoint of the practical volume of the pressure-resistant container and maintaining a pheromone concentration equal to or higher than a certain concentration in the field to be controlled. Further, it is also possible to change the intervals of spray events in accordance with the season, the weather, the state of emergence of insect pests, and the like.

The time zone for spraying the aerosol composition into the field may be selected in accordance with the ecology of the insect pest to be controlled. For example, a spray event or events may be carried out by selecting the time zone of from 6:00 p.m. to 6:00 a.m. with respect to an insect pest that engages in mating activity after sunset. It is also possible to change the time zone of spray event or events in accordance with the season, the weather, the state of emergence of insect pests, and the like.

When the method for mating disruption is carried out, for example, by using Z11Z13-hexadecadienal as an aliphatic linear aldehyde having 10 to 20 carbons, the navel orangeworm and the like having Z11Z13-hexadecadienal as a sex pheromone can be efficiently controlled. Further, since a high control effect is obtained by using Z11Z13-hexadecadienal having very unstable ZZ-conjugated carbon-carbon double bonds, it is expected that a high control effect can be obtained in the same manner when the aerosol sprayer for insect pest mating disruption is applied to an aliphatic linear aldehyde having 10 to 20 carbon atoms other than the Z11Z13-hexadecadienal in accordance with the invention.

EXAMPLES

Hereinafter, the invention will be described more specifically with reference to Examples. It should not be construed that the invention is limited to or by Examples.

Example 1

The Z11Z13-hexadecadienal and heptane were mixed at a composition ratio shown in Table 1 to prepare 210 g of an aerosol stock solution, and then the aerosol stock solution was added into a pressure-resistant aluminum container of 65×180 mm (hereinafter, also referred to as an "aerosol can"). Subsequently, a metered spray valve for a spray volume of 40 µl was attached to the aerosol can, and then the aerosol can was filled with 118 g of liquid dimethyl ether (DME) under pressure to produce an aerosol sprayer for insect pest mating disruption. More specifically, the navel orangeworm mating disruption content was substituted with the above-mentioned composition for insect pest mating disruption with respect to the aerosol sprayer ISOMATE® NOW MIST produced by Pacific Biocontrol Corporation, Vancouver, W.A., U.S.A., which is an aerosol preparation for the navel orangeworm mating disruption. The composition ratio and spray characteristics of the produced aerosol sprayer for insect pest mating disruption are shown in Table 2.

Particle sizes of the sprayed particles were determined using a laser diffraction type particle size distribution measuring apparatus (Spraytech, product of Malvern Instruments Limited). More specifically, the spray port was installed at 25° C. and at a distance of 15 cm from the laser, and then the spray was carried out in such a manner to allow the laser to perpendicularly penetrate through the center of the group of the sprayed particles to measure the medium particle size (Dv50), 10% particle size (Dv10), and 90% particle size (Dv90) in the volume-based cumulative particle size distribution. The measurement was carried out three times, and then the average value thereof was used as a measurement value.

The design value of the metered spray valve was used as the sprayed volume.

The sprayed volume of the aliphatic linear aldehyde having 10 to 20 carbon atoms was calculated by multiplying the weight loss per spray event by the concentration (i.e., weight percent) of the aliphatic linear aldehydes having 10 to 20 carbon atoms.

Example 2

The same procedure as in Example 1 was carried out except that the aerosol stock solution was replaced by 180 g of an aerosol stock solution having the composition ratio shown in Table 2 and the amount of DME was changed to 148 g.

Example 3

The same procedure as in Example 1 was carried out except that the aerosol stock solution was replaced by 151 g of an aerosol stock solution having the composition ratio shown in Table 2 and the amount of DME was changed to 177 g.

Example 4

The same procedure as in Example 1 was carried out except that the aerosol stock solution was replaced by 151 g of an aerosol stock solution having the composition ratio shown in Table 2, the amount of DME was changed to 177 g, and the weight percentage of Z11Z13-hexadecadienal was changed.

Comparative Example 1

The same procedure as in Example 1 was carried out except that the aerosol stock solution was replaced by 253 g of an aerosol solution having the composition ratio shown in Table 2 and the amount of DME was changed to 75 g.

Comparative Example 2

The same procedure as in Example 1 was carried out except that the aerosol stock solution was replaced by 115 g of an aerosol solution having the composition ratio shown in Table 2 and the amount of DME was changed to 213 g.

Comparative Example 3

The same procedure as in Example 1 was carried out except that a commercially available ISOMATE® NOW MIST (Pacific Biocontrol Corporation) was used as the aerosol sprayer for insect pest mating disruption.

TABLE 2

| | composition for aerosol | | | diameter of sprayed particles | | | spray volume | sprayed amount of aliphatic linear aldehyde having 10 to 20 carbon atoms |
|---|---|---|---|---|---|---|---|---|
| | stock solution (% by weight) | | propellant | | | | | |
| | aliphatic linear aldehyde having 10 to 20 carbon atoms | non-alcoholic diluent | (% by weight) | Dv10 | Dv50 | Dv90 | (µL) | (mg) |
| Example1 | Z11Z13-hexadecadienal (2.2) | heptane (61.8) | DME (36.0) | 31.1 | 62.7 | 145.3 | 40 | 0.64 |
| Example2 | Z11Z13-hexadecadienal (2.2) | heptane (52.8) | DME (45.0) | 12.6 | 44.9 | 102.9 | 40 | 0.68 |
| Example3 | Z11Z13-hexadecadienal (2.2) | heptane (43.8) | DME (54.0) | 5.3 | 40.1 | 85.0 | 40 | 0.69 |
| Example4 | Z11Z13-hexadecadienal (11.0) | heptane (32.8) | DME (54.0) | 20.4 | 58.0 | 133.3 | 40 | 3.50 |
| Comp. Ex. 1 | Z11Z13-hexadecadienal (2.2) | heptane (74.8) | DME (23.0) | 39.4 | 91.1 | 236.6 | 40 | 0.60 |
| Comp. Ex. 2 | Z11Z13-hexadecadienal (2.2) | heptane (32.8) | DME (65.0) | 3.2 | 28.2 | 59.1 | 40 | 0.73 |
| Comp. Ex. 3 | ISOMATE ® NOW MIST (Pacific Biocontrol Corporation) | | | 37.5 | 80.4 | 178.6 | 40 | 0.61 |

Examples 5 to 8 and Comparative Examples 4 to 6

Each of the same aerosol sprayers for insect pest mating disruption as those in Examples 1 to 4 and Comparative Examples 1 to 3 was equipped with the same built-in spray button as one used for the spray characteristic evaluation, and was installed in an almond field of Glenn Country, California, U.S.A., and the test of controlling navel orangeworm was carried out.

All of the aerosol sprayers for insect pest mating disruption were evaluated under the same test conditions as shown in Table 3. Each spray button was pressed automatically every 9 minutes as the spray event interval.

In addition, there was provided a control plot in which only conventional control such as application of pesticides (Asana® produced by Sumitomo Chemical Co., Ltd.; and Agrimec produced by Syngenta Corporation) was carried out without an aerosol sprayer for mating disruption. Thus, the insect pest control effects were examined in comparison with the control plot.

TABLE 3

| area of the field | 40 acres |
|---|---|
| installation number of sprayers | 40 sprayers |
| installation date | late April, 2019 |
| time zone for spray events | from 10 p.m. to 6 a.m. |
| spray event intervals | 9 minutes |

Four pheromone traps for navel orangeworm were installed in each treatment plot of 40 acres, and the number of captured male adult worms was checked every about one to two weeks from late April to the middle of August. The results are shown in Table 4.

The total number trapped in Table 4 means the average number of male adults per trap with respect to the number of male adult insects captured in the above period. The attraction inhibition rate (often referred to as "percent trap shutdown") was calculated from the following equation.

Attraction inhibition ratio (%)=(1−the number of adults trapped in treatment plot/the number of adults trapped in control plot)×100

In addition, 1,000 almonds harvested in each plot were collected indiscriminately to check the presence of the damage by navel orangeworms. The damage ratio and the damage reduction ratio were calculated from the following equations, respectively.

damage ratio (%)=(number of damaged almonds/ number of inspected almonds)×100 damage reduction ratio (%)=(1−damage ratio in treatment plot/damage ratio in control plot)×100

TABLE 4

| | aerosol sprayer for mating disruption | total number of male adult navel orangeworms captured per trap | attraction inhibition ratio (%) | damage ratio of almonds (%) | damage reduction ratio (%) |
|---|---|---|---|---|---|
| Example5 | Example1 | 0.5 | 99.9 | 1.6 | 68 |
| Example6 | Example2 | 0.6 | 99.8 | 0.6 | 88 |
| Example7 | Example3 | 1.0 | 99.7 | 0.9 | 82 |
| Example8 | Example4 | 0.5 | 99.9 | 0.6 | 88 |
| Comp. Ex. 4 | Comp. Ex. 1 | 6.0 | 98.4 | 3.7 | 26 |
| Comp. Ex. 5 | Comp. Ex. 2 | 4.2 | 98.9 | 3.2 | 36 |
| Comp. Ex. 6 | Comp. Ex. 3 | 3.0 | 99.2 | 2.8 | 44 |
| control plot | | 384.7 | — | 5.0 | — |

As shown in Table 3, the attraction inhibition ratio was high in each of the fields of Examples 5 to 8 and Comparative Examples 4 to 6. However, a higher tendency was observed in Examples 5 to 8 than in Comparative Examples 4 to 6. On the other hand, the difference in the damage reduction ratio was more remarkable, and the damage reduction ratios in Examples 5 to 8 were higher than those in Comparative Examples 4 to 6.

It was found that the aerosol sprayers for the insect pest mating disruption in each of Examples 1 to 4 have a higher insect pest control effect than aerosol sprayers providing sprayed particles having larger particle sizes in the particle size distribution in Comparative Examples 1 and 3 and the aerosol sprayers providing sprayed particles having smaller particle sizes in the particle size distribution in Comparative Example 2. Such a high control effect is considered to be obtained because of the following reasons. The diameters of the particles sprayed from the aerosol sprayers for the insect pest mating disruption in Examples 1 to 4 are not as large as those in Comparative Examples 1 and 3 in which the control effect was impaired by falling on the ground surface; and are not as small as those in Comparative Example 2 in which the control effect is impaired by the oxidative decomposition of the aliphatic linear aldehyde having 10 to 20 carbon atoms. Accordingly, the aerosol sprayers in Examples 1 to 4 were able to secure the longer flight duration for diffusion into the field, thereby bringing high control effects.

The invention claimed is:

1. An aerosol sprayer for insect pest mating disruption, the sprayer comprising:
    a composition for forming an aerosol, the composition comprising:
    an aerosol stock solution containing an aliphatic linear aldehyde having 10 to 20 carbon atoms and a non-alcoholic diluent; and
    dimethyl ether as a propellant;
    wherein a weight ratio of the aerosol stock solution to the propellant is from 45:55 to 65:35; and
    a pressure-resistant container for enclosing the composition therein;
wherein sprayed particles at a spray travel distance of 15 cm have a median particle size (Dv50) at 25° C. of from 38 to 65 µm in a volume-based cumulative particle size distribution.

2. The aerosol sprayer for insect pest mating disruption according to claim 1, wherein the non-alcoholic diluent is selected from hydrocarbons.

3. The aerosol sprayer for insect pest mating disruption according to claim 2, wherein the non-alcoholic diluent is heptane.

4. The aerosol sprayer for insect pest mating disruption according to claim 1, wherein the aliphatic linear aldehyde is Z11Z13-hexadecadienal.

5. The aerosol sprayer for insect pest mating disruption according to claim 1, wherein the sprayed particles at a spray travel distance of 15 cm have a 90% particle size (Dv90) at 25° C. of from 65 to 150 µm in the volume-based cumulative particles size distribution.

6. The aerosol sprayer for insect pest mating disruption according to claim 1, wherein the sprayed particles at a spray travel distance of 15 cm have a 10% particle size (Dv10) at 25° C. of from 5 to 35 µm in the volume-based cumulative particle size distribution.

7. The aerosol sprayer for insect pest mating disruption according to claim 1, wherein the weight ratio is from 50:50 to 60:40.

8. The aerosol sprayer for insect pest mating disruption according to claim 1, wherein the non-alcoholic diluent is heptane and the aliphatic linear aldehyde is Z11Z13-hexadecadienal.

9. A method for insect pest mating disruption, the method comprising steps of:
    installing the aerosol sprayer of claim 1 at a concentration of 0.5 to 4 sprayers/acre in a field; and
    spraying the composition in the aerosol sprayer into a field.

10. The method for insect pest mating disruption according to claim 9, wherein a sprayed volume of the composition per spray event is 20 to 100 µL, and each spray event is carried out at an interval of from 5 to 20 minutes.

11. The method for insect pest mating disruption according to claim 10, wherein the aliphatic linear aldehyde contained in the sprayed volume per spray event is in an amount of 0.3 to 5 mg.

12. A method for insect pest mating disruption, the method comprising a step of spraying a composition for forming an aerosol into a field in such a manner that sprayed particles at a spray travel distance of 15 cm have a median particle size (Dv50) at 25° C. of from 35-38 to 65 µm in a volume-based cumulative particle size distribution,
    wherein the composition comprises:
        an aerosol stock solution containing an aliphatic linear aldehyde having 10 to 20 carbon atoms and a non-alcoholic diluent; and
        dimethyl ether as a propellant;
        wherein a weight ratio of the aerosol stock solution to the propellant is from 45:55 to 65:35.

13. The method for insect pest mating disruption according to claim 12, wherein the sprayed particles at a spray travel distance of 15 cm have a 90% particle size (Dv90) at 25° C. of from 65 to 150 µm in the volume-based cumulative particle size distribution.

14. The method for insect pest mating disruption according to claim 12, wherein the sprayed particles at a spray travel distance of 15 cm have a 10% particle size (Dv10) at 25° C. of from 5 to 35 µm in the volume-based cumulative particles size distribution.

15. The method for insect pest mating disruption according to claim 12, wherein a sprayed volume of the composition per spray event is from 20 to 100 µL and each spray event is carried out at an interval of from 5 to 20 minutes.

16. The method for insect pest mating disruption according to claim 15, wherein the aliphatic linear aldehyde contained in the sprayed volume per spray event is in an amount of 0.3 to 5 mg.

* * * * *